(12) United States Patent
Schwartz et al.

(10) Patent No.: US 12,478,905 B2
(45) Date of Patent: Nov. 25, 2025

(54) FILTER ASSEMBLIES WITH UNIQUE SHAPES

(71) Applicant: Cummins Filtration Inc., Nashville, TN (US)

(72) Inventors: Scott W. Schwartz, Cottage Grove, WI (US); Matthew Louison, McFarland, WI (US); Ming Ouyang, Short Hills, NJ (US); Akshay Joshi, Fitchburg, WI (US); Jeremiah Cupery, Madison, WI (US); Miao Li, McFarland, WI (US); Jessie A. Knight, Oregon, WI (US); Jeffrey A. Rech, Verona, WI (US); Mark P. Adams, Madison, WI (US)

(73) Assignee: Cummins Filtration Inc., Nashville, TN (US)

( * ) Notice: Subject to any disclaimer, the term of this patent is extended or adjusted under 35 U.S.C. 154(b) by 439 days.

(21) Appl. No.: 18/028,663

(22) PCT Filed: Oct. 5, 2021

(86) PCT No.: PCT/US2021/053474
§ 371 (c)(1),
(2) Date: Mar. 27, 2023

(87) PCT Pub. No.: WO2022/076346
PCT Pub. Date: Apr. 14, 2022

(65) Prior Publication Data
US 2023/0364542 A1 Nov. 16, 2023

Related U.S. Application Data

(60) Provisional application No. 63/088,099, filed on Oct. 6, 2020.

(51) Int. Cl.
*B01D 46/00* (2022.01)
*B01D 46/52* (2006.01)
*B01D 46/58* (2022.01)

(52) U.S. Cl.
CPC ....... *B01D 46/0001* (2013.01); *B01D 46/527* (2013.01); *B01D 46/58* (2022.01); *B01D 2201/125* (2013.01); *B01D 2201/32* (2013.01)

(58) Field of Classification Search
None
See application file for complete search history.

(56) References Cited

U.S. PATENT DOCUMENTS

| 6,190,432 B1 | 2/2001 | Gieseke et al. |
| 6,273,938 B1 | 8/2001 | Fanselow et al. |

(Continued)

FOREIGN PATENT DOCUMENTS

| DE | 102018116576 B2 | 11/2019 |
| EP | 1 136 112 A1 | 9/2001 |

(Continued)

OTHER PUBLICATIONS

Extended European Search Report issued for European Patent Application No. 21878319.9 issued Sep. 12, 2024, 7 pages.

(Continued)

*Primary Examiner* — Brit E. Anbacht
(74) *Attorney, Agent, or Firm* — BENESCH, FRIEDLANDER, COPLAN & ARONOFF LLP (57) ABSTRACT

A method of manufacturing a media assembly comprises winding a filter media about a center axis into a media roll and cutting the media roll along at least two cut lines and into at least two media packs of at least two media assemblies. The media roll is cut along at least one plane that is parallel to the center axis.

20 Claims, 8 Drawing Sheets

(56) References Cited

U.S. PATENT DOCUMENTS

| | | |
|---|---|---|
| 6,416,605 B1 | 7/2002 | Golden |
| 7,156,643 B2 | 1/2007 | Parrinello |
| 7,247,183 B2 | 7/2007 | Connor et al. |
| 7,329,326 B2 | 2/2008 | Wagner et al. |
| 7,569,090 B2 * | 8/2009 | Nelson ............... B01D 46/0001 210/493.4 |
| 7,909,954 B2 | 3/2011 | Johnston et al. |
| 8,034,145 B2 | 10/2011 | Boehrs et al. |
| 8,163,057 B2 | 4/2012 | Blossey et al. |
| 8,277,532 B2 | 10/2012 | Reichter et al. |
| 8,397,920 B2 | 3/2013 | Moy et al. |
| 8,409,316 B2 | 4/2013 | Nelson et al. |
| 8,480,779 B2 | 7/2013 | Boehrs et al. |
| 8,496,723 B2 | 7/2013 | Reichter et al. |
| 8,545,585 B2 | 10/2013 | Raether |
| 10,150,074 B2 | 12/2018 | Hegner et al. |
| 10,188,978 B2 | 1/2019 | Krull et al. |
| 2003/0053940 A1 | 3/2003 | Harada et al. |
| 2004/0118771 A1 | 6/2004 | Schukar et al. |
| 2006/0151655 A1 | 7/2006 | Johnston |
| 2011/0047887 A1 * | 3/2011 | Contreras ............. E04D 13/076 52/12 |
| 2011/0113736 A1 | 5/2011 | Raether et al. |
| 2015/0023845 A1 | 1/2015 | Flagstad et al. |
| 2016/0136561 A1 * | 5/2016 | Nelson ................. B01D 46/525 55/502 |
| 2018/0214806 A1 * | 8/2018 | Tate ..................... B01D 46/526 |
| 2018/0257017 A1 | 9/2018 | Adamek et al. |
| 2019/0111374 A1 | 4/2019 | Burton et al. |
| 2019/0168151 A1 | 6/2019 | Biltcliffe et al. |
| 2020/0061512 A1 | 2/2020 | Holzmann et al. |
| 2020/0108342 A1 | 4/2020 | Holm et al. |
| 2023/0356130 A1 | 11/2023 | Proost et al. |
| 2023/0364542 A1 * | 11/2023 | Schwartz ............ B01D 46/527 |

FOREIGN PATENT DOCUMENTS

| | | | |
|---|---|---|---|
| JP | 2023517538 A * | 4/2023 | ........... B01D 46/527 |
| WO | 2018152090 A1 | 8/2018 | |
| WO | WO-2019060904 A2 * | 3/2019 | ........... B01D 46/525 |
| WO | WO-2021/040676 A1 | 4/2021 | |
| WO | WO-2021/118524 A1 | 6/2021 | |

OTHER PUBLICATIONS

First Office Action issued for Indian Patent Application No. 202347017726 issued May 23, 2023, 7 pages.

International Search Report and Written Opinion issued for PCT Application No. PCT/US2021/053474 issued Jan. 7, 2022, 14 pages.

Office Action issued in Chinese Patent Application No. 202180063857. 6, dated Jul. 16, 2025.

* cited by examiner

FILTER ASSEMBLIES WITH UNIQUE SHAPES

CROSS REFERENCE TO RELATED APPLICATIONS

The present application is a National Phase based on PCT Application No. PCT/US2021/053474, filed Oct. 5, 2021, which claims the benefit of U.S. Provisional Patent Application No. 63/088,099, filed Oct. 6, 2020, the entire disclosure of which is incorporated herein by reference. The contents of these applications are incorporated by reference in their entireties.

FIELD

The present application relates generally to filter assemblies for air intake systems or the like.

BACKGROUND

Figure 1A:
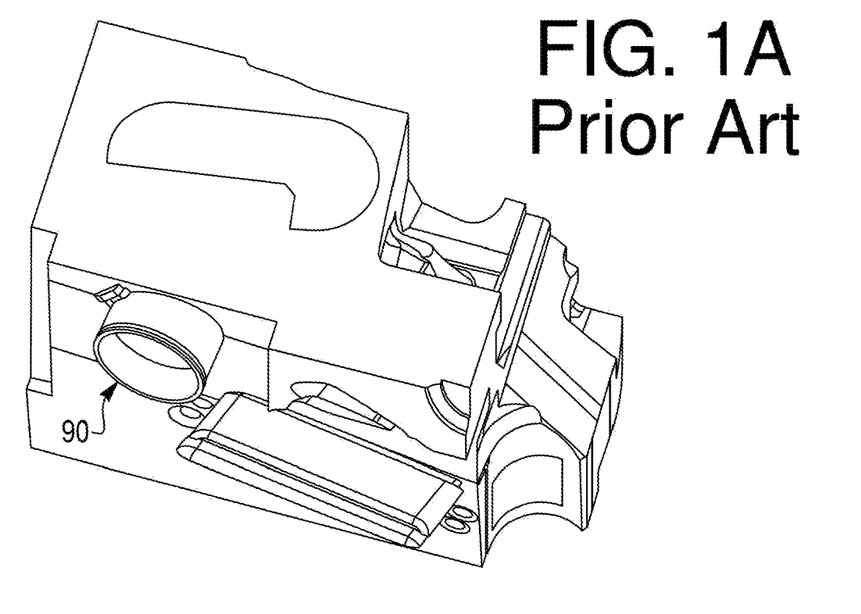
FIG. 1A is a perspective view space available for a conventional filter assembly within, for example, a vehicle.
Figure 1B:
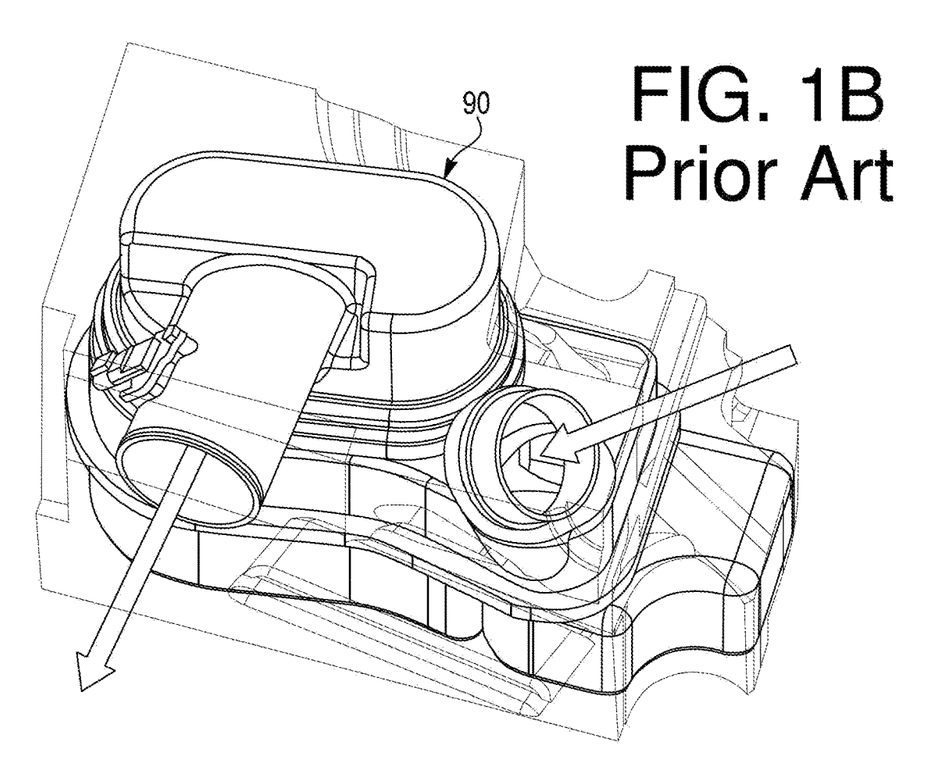
FIG. 1B is a perspective view of the filter assembly of FIG. 1A.

Typically, air intake systems are packaged in very space-constrained under-hood environments with a very limited amount of available space to fit into. Accordingly, the air intake components of an air filter assembly need to be uniquely packaged, offer a compact package volume, and have a high degree of shape flexibility to fit with and around other under-hood components. Furthermore, it is desired for the air filter assembly (in particular the air filter element) to be low cost. One example of a filter assembly 90 is shown in FIGS. 1A-1B. FIG. 1A shows the limited amount of space and an unusually-shaped space that is available (within, for example, a vehicle) for the filter assembly 90. To fit within this limited and unusually-shaped space, the filter assembly 90 is also small and unusually shaped, and the resulting available space for the filter element within the housing of the filter assembly 90 is also relatively small and unusually-shaped.

Although conventional filter elements with round, obround, or rectangular flow faces can be used instead of traditional pleated cylindrical air cleaners, packaging air cleaners within engine compartments has become increasingly challenging as available space continues to be reduced in an effort to minimize the size and weight of the vehicle to optimize fuel efficiency. Air cleaners that better fit around tubes or align with gradually sloping body panels are needed, without sacrificing cost or performance.

SUMMARY

Various embodiments provide for a method of manufacturing a media assembly comprising winding a filter media about a center axis into a media roll and cutting the media roll along at least two cut lines and into at least two media packs of at least two media assemblies. The media roll is cut along at least one plane that is parallel to the center axis.

Various other embodiments provide for a media assembly comprising a media pack comprising a plurality of layers of filter media, a first side panel, and a second side panel. The media pack defines an inlet flow face, an outlet flow face, a first side wall, a second side wall, a radially inner edge, and a radially outer edge. The first side wall and the second side wall each extend axially between the inlet flow face and the outlet flow face and radially between the radially inner edge and the radially outer edge. The first side panel is positioned along and forms a seal with the first side wall such that fluid entering through the inlet flow face cannot exit the media pack through the first side wall. The second side panel is positioned along and forms a seal with the second side wall such that fluid entering through the inlet flow face cannot exit the media pack through the second side wall. The media pack is formed by winding the filter media around a center axis into a media roll and cutting the media roll along at least two cut lines to form the first side wall and the second side wall.

Various other embodiments provide for a filter element that comprises a media assembly. The media assembly comprises a media pack comprising a plurality of layers of filter media, a first side panel, and a second side panel. The media pack defines an inlet flow face, an outlet flow face, a first side wall, a second side wall, a radially inner edge, and a radially outer edge. The first side wall and the second side wall each extend axially between the inlet flow face and the outlet flow face and radially between the radially inner edge and the radially outer edge. The first side panel is positioned along and forms a seal with the first side wall such that fluid entering through the inlet flow face cannot exit the media pack through the first side wall. The second side panel is positioned along and forms a seal with the second side wall such that fluid entering through the inlet flow face cannot exit the media pack through the second side wall. The media pack is formed by winding the filter media around a center axis into a media roll and cutting the media roll along at least two cut lines to form the first side wall and the second side wall.

These and other features, together with the organization and manner of operation thereof, will become apparent from the following detailed description when taken in conjunction with the accompanying drawings, wherein like elements have like numerals throughout the several drawings described below.

DETAILED DESCRIPTION

Referring to the figures generally, various embodiments disclosed herein relate to a media assembly for an air filter element and method of making a media assembly in which the media assembly can have a wide variety of different unique shapes, according to the desired use and available space. The media assembly is dimensionally flexible and can quickly, easily, and cost-effectively be made into a wide variety of different shapes and sizes according to the need. Furthermore, the media assembly and method of making the media assembly described herein is low cost and effective, in particular with smaller media assemblies.

Figure 2A:
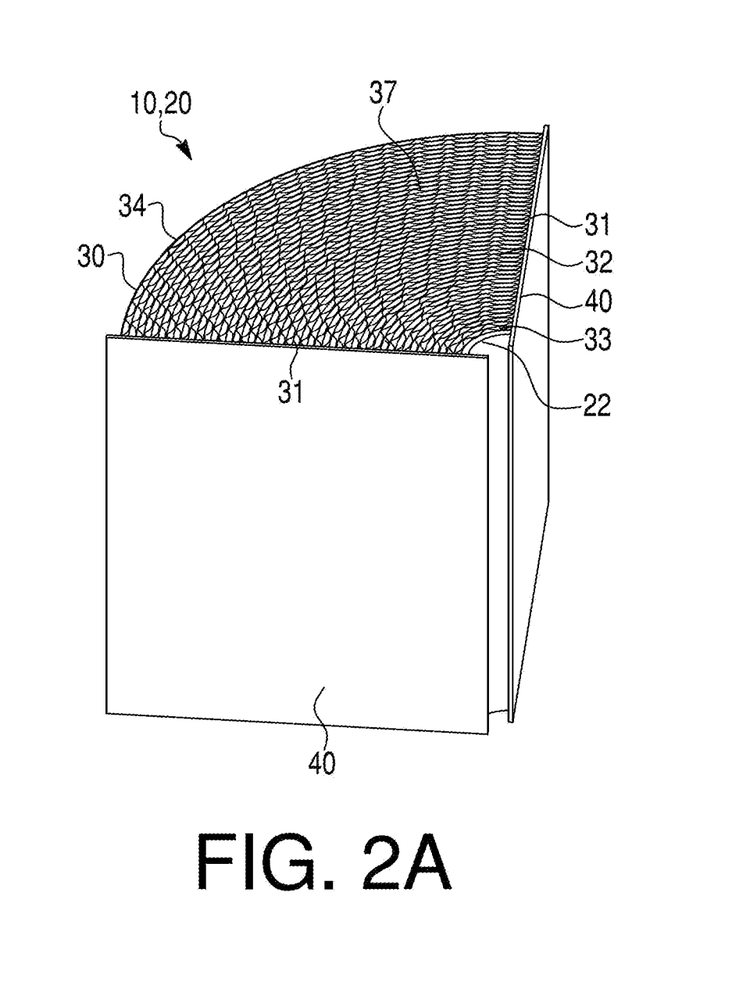
FIG. 2A is a perspective view of a media assembly of a filter element according to one embodiment.
Figure 2B:
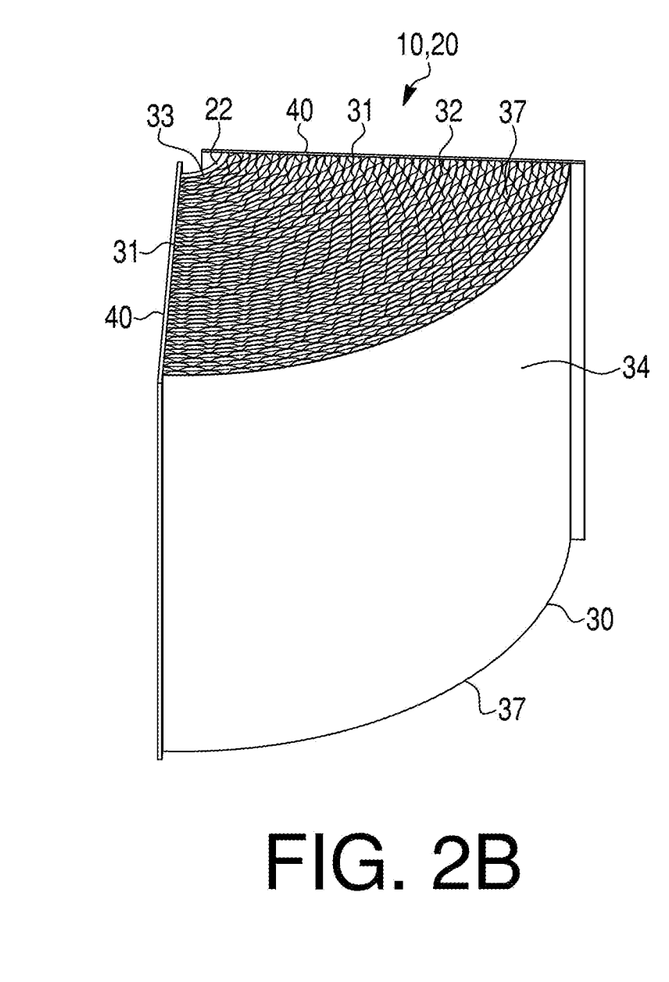
FIG. 2B is a perspective view of the media assembly of FIG. 2A.
Figure 3:
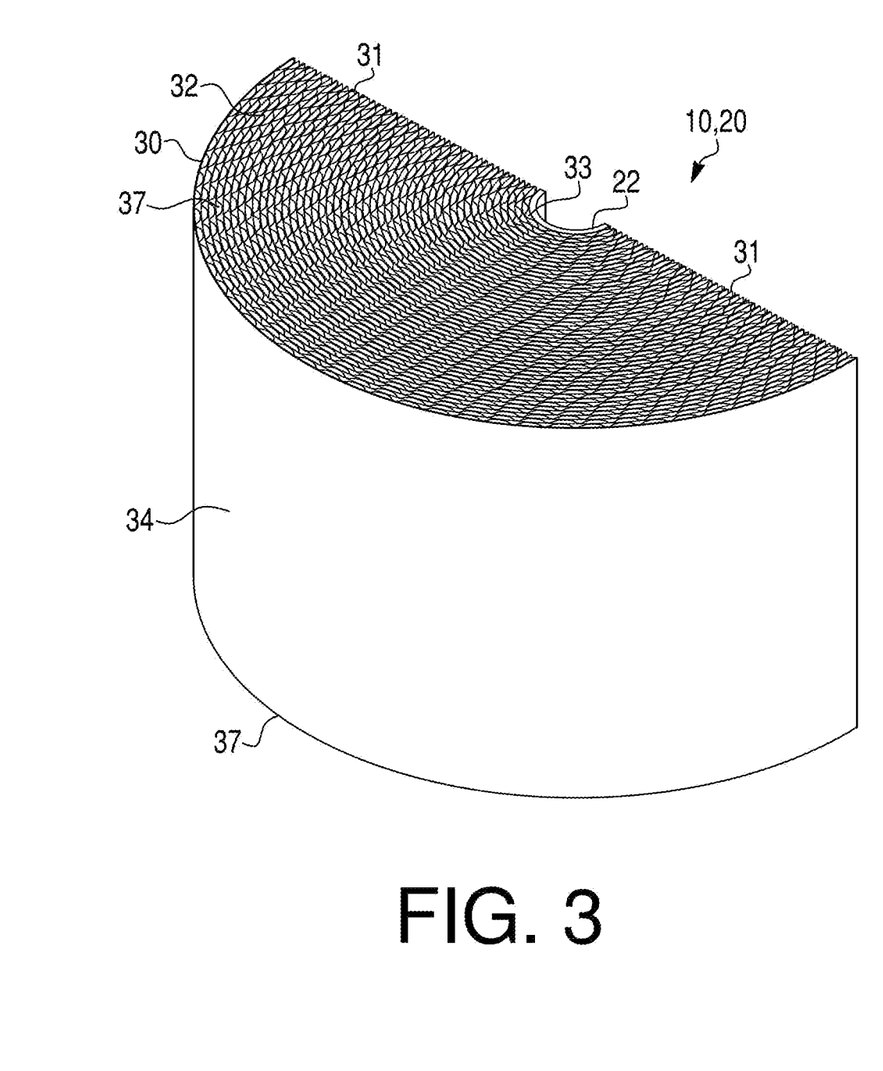
FIG. 3 is a perspective view of a media assembly of a filter element according to another embodiment.

FIGS. 2A-3 show various embodiments of a filter element 10 of a filter assembly that comprises a media assembly 20 and may be used with an engine, according to one embodiment. The filter element 10 may include other components, such as at least one endplate or endcap positioned along an end of the media assembly 20. The filter element 10 may be positioned within a housing of the filter assembly, such as the housing of the filter assembly 90 shown in FIGS. 1A-1B.

The media assembly 20 comprises a media pack 30, a side panel 40, and a center support 22. The media assembly 20 may optionally be or comprise a right-angle flow element, through which unfiltered fluid and filtered fluid flow at approximately 90° from each other. As described further herein, the shape and size of the media assembly 20 can be uniquely and easily made according to the desired configuration.

The media assembly 20 can be formed in a wide variety of unique shapes without specialized manufacturing equipment. By having a unique media assembly shape (and being able to easily make media assemblies with a wide variety of shapes), the media assembly 20 can fit within a wide range and large number of unusually and uniquely-shaped and sized areas within a filter assembly and to fit within a uniquely-shaped filter housing, according to the desired use and configuration. The media assembly 20 also provides further degrees of packaging freedom without sacrificing cost or performance. According to one embodiment, the media assembly 20 can fit around charge-air-cooler (CAC) tubing. Alternatively or additionally, the media assembly 20 may fit over an engine and against a cab wall. This flexibility in size and shape may also limit or prevent substandard or counterfeit media assemblies from being used and installed.

Figure 4A:
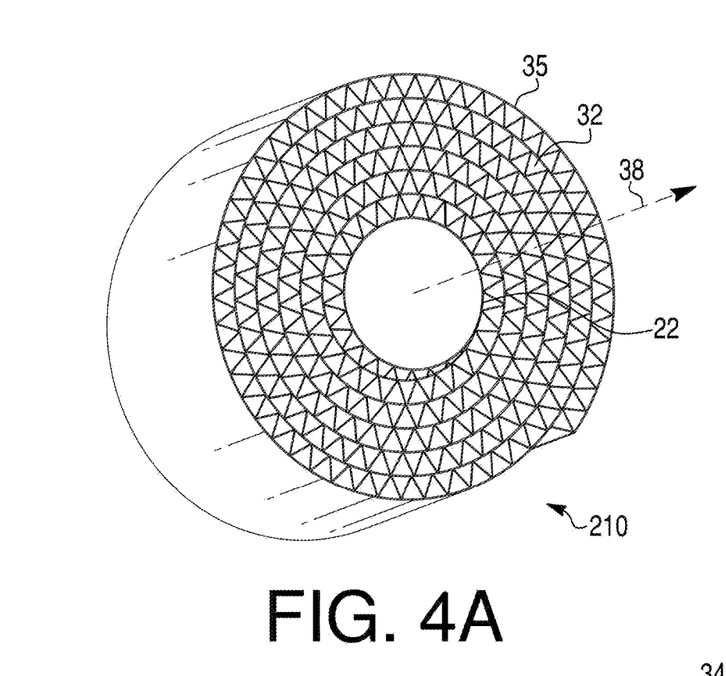
FIG. 4A is a perspective view of a media roll according to another embodiment.

The media pack 30 (which may be referred to as a media segment) is a portion of and formed from a filter media roll 35 (as shown in FIG. 4A and as described further herein). The media pack 30 is configured to filter a fluid, such as air, and comprises at least one layer (preferably a plurality of layers) of filter media 32, where the plurality of layers of filter media 32 are substantially parallel and concentric with each other. The plurality of layers of the filter media 32 comprises an innermost layer 32a and an outermost layer 32b, as shown in FIG. 4C. The innermost layer 32a is the first layer of the filter media 32 that is wound into the media roll 35 and defines the inner side 33 of the media pack 30. The outermost layer 32b is the last layer of the filter media 32 that is wound into the media roll 35 and defines the outer side 34 of the media pack 30. The innermost layer 32a is radially closer to the center axis 38 (and to the center support 22 and/or the core 23) than the outermost layer 32b. The innermost layer 32a and the outermost layer 32b follow and have the same curvature (between the two cut sides 31) and have substantially the same axial length (between the two flow faces 37). According to various embodiments (in which the media pack 30 is at least partially curved), the outermost layer 32b is longer than the innermost layer 32a.

The media pack 30 is formed by winding the filter media 32 about the center axis 38 into the media roll 35 and cutting the media roll 35 along at least two cut lines 14 to form the two cut sides 31 (which may be referred to as a first side wall and a second side wall), as described further herein. The same media pack 30 can comprise multiple different types of filter media 32 by winding different filter media 32 into the same media roll 35. For example, the filter media 32 within a media pack 30 includes a corrugated filter media including a plurality of corrugations which may comprise different corrugation heights to provide multiple corrugation heights within the same media pack 30.

As shown in FIGS. 2B-3, each media pack 30 (in particular the plurality of layers of filter media 32) has and defines two parallel and opposite, radially-extending, flow faces 37, through which a fluid to be (or being) filtered flows. The flow faces 37 extend radially between the inner side 33 and the outer side 34 and along planes that are substantially perpendicular to the center axis 38 of the media roll 35. One of the flow faces 37 is an inlet flow face, and the other flow face is an outlet flow face. Accordingly, the fluid flows through the media pack 30 in a direction that is parallel to the center axis 38 (i.e., the fluid flows in the axial direction of the media pack 30 between the two flow faces 37). The flow faces 37 may optionally be substantially flat and parallel to each other.

Each media pack 30 (in particular the plurality of layers of filter media 32) has and defines two flat, radially-extending cut edges, surfaces, ends, or sides 31 that are on opposite radial ends of the media pack 30 and are where the media pack 30 was cut from the media roll 35 (as described further herein). The first and second cut sides 31 (i.e., the first side wall and the second side wall) extend axially between the two flow faces 37, radially between the inner side 33 and the outer side 34, and along planes that are substantially parallel to the center axis 38 of the media roll 35. The two cut sides 31 are substantially perpendicular to the two flow faces 37 (and optionally also the inner side 33 and the outer side 34). Depending on the relative orientation of the two cut lines 14 creating the two cut sides 31, the cut sides 31 may be parallel or angled relative to each other.

Each media pack 30 (in particular the plurality of layers of filter media 32) also includes and defines two radiused sides: a radially inner surface or side 33 and a radially outer surface or side 34. The inner side 33 is radially closer to the center axis 38 of the media roll 35 (from which the media pack 30 is cut) and is the innermost side of the first, innermost layer 32a of the filter media 32. The outer side 34 is the radially further from the center axis 38 of the media roll 35 (from which the media pack 30 is cut) and is the outermost side of the last, outermost layer 32b of the filter media 32. If the media pack 30 includes a center support 22, the center support 22 extends axially along the inner side 33 (and is radially inward from the inner side 33). Both the inner side 33 and the outer side 34 extend axially between the two flow faces 37 and extend between the inner side 33 and the outer side 34. The two cut sides 31 are on opposite ends of the inner side 33 and the outer side 34 from each other. The inner side 33 and the outer side 34 extend axially, substantially parallel to the center axis 38 of the media roll 35. The two cut sides 31, the two flow faces 37, the inner side 33, and the outer side 34 form all of the outermost sides of the media pack 30 (and therefore the overall shape of the media pack 30).

According to various embodiments (and depending on how the filter media 32 is wound into the media roll 35 and where the media roll 35 is cut), the plurality of layers of filter media 32 curve about the center axis 38 and form an arched shape. Accordingly, the inner side 33 (of the media pack 30 and of the innermost layer 32a of the plurality of layers of the filter media 32) and the outer side 34 (of the media pack 30 and of the outermost layer 32b of the plurality of layers of the filter media 32) each have circular arc shapes (depending on the overall cross-sectional shape of the media roll 35 and the number and positioning of the cut lines 14), extend axially parallel to each other, and share a common center axis (i.e., the center axis 38). The shape of the inner side 33 and the outer side 34 may match each other (with the inner side 33 being smaller than the outer side 34). Since the outer side 34 is wound around the inner side 33, the inner side 33 has a smaller arc length than the outer side 34. Depending on how the media roll 35 is wound (and the shape of the center support 22 and/or the core 23), the inner side 33 and the outer side 34 may have a circular or rounded arc shape (while the cut sides 31 may be straight or flat).

According to one embodiment, the filter media 32 may comprise a variety of different types of filter media, including but not limited to pleated media, corrugated media, tetrahedral media, or variations thereof, such as any of the filter media disclosed in PCT Application No. PCT/US 2019/065259, the entirety of which is incorporated by reference. U.S. Pat. No. 8,397,920, entitled "PLEATED FILTER ELEMENT WITH TAPERING BEND LINES," by Moy et al, filed on Oct. 14, 2011, and issued on Mar. 19, 2013, assigned to Cummins Filtration IP Inc., which is incorporated by reference in its entirety and for all purposes, describes a tetrahedral filter media that the filter media 32 may comprise. Some configurations of tetrahedral filter media may comprise a plurality of inlet tetrahedron flow channels and a plurality of outlet tetrahedron flow channels. The inlet tetrahedron merge in a central portion of the tetrahedral filter media thereby allowing axial cross-flow of air between the inlet tetrahedron channels prior to the air passing through the tetrahedral filter media. Such an arrangement provides for additional dust loading on the upstream side of the media, which increases the overall dust capacity of the filter.

The filter media 32 may comprise, for example, corrugated, flat, fluted, or pleated filter media. For example, the filter media 32 may have a pleated arrangement with, for example, arc or fan pleats. Optionally, the filter media 32 may have deep pleats (which may be used with right-angle flow). The pleats may fan radially inwardly or outwardly, depending on the desired configuration. The layers of filter media 32 within the media roll 35 (and thus within the media pack 30) may be curved in a parallel manner to each other due to how the filter media 32 is wound around itself.

The filter media coil or roll 35 is the filter media 32 rolled or layered around the center axis 38, before being cut into the plurality of media packs 30 (as described further herein). Depending on how the media roll 35 is formed by rolling the filter media 32, the media roll 35 may have a variety of different cross-sectional shapes (where the cross-section is taken along a plane that is perpendicular to the axial length of the media roll 35 and to the center axis 38). For example, the media roll 35 may have a round, obround, oval, or rectangular cross-sectional shape. The media roll 35 may be a full, circular ring. The center axis 38 extends in the axial direction of the media roll 35.

Depending on the shape of the media roll 35 and how the media roll 35 is cut (as described further herein), the media pack 30 may have a variety of different shapes, which allows the media pack 30 to fit within a wide variety of different spaces. For example, the media pack 30 may be relatively longer or shorter, depending on the desired configuration.

First and second side panels 40 (which may be referred to as end panels) are positioned along and extend substantially parallel to the two side walls (e.g., axially between the inlet flow face and the outlet flow face, as well as radially between the inner side 33 (e.g., an inner edge) and the outer side 34 (e.g., an outer edge). In particular, the first side panel 40 is positioned along and forms a seal with the first cut side 31 (i.e., the first side wall) of the media pack 30 such that fluid entering through the inlet flow face 37 cannot exit the media pack 30 through the first cut side 31. The second side panel 40 is positioned along and forms a seal with the second cut side 31 (i.e., the second side wall) of the media pack 30 such that fluid entering through the inlet flow face 37 cannot exit the media pack 30 through the second cut side 31. The side panels 40 can be molded or otherwise secured to the cut ends 31 of the media pack 30 to ensure that fluid does not escape through the cut ends 31. The side panels 40 extend along the entire cut sides 31, axially along the length of the media pack 30 between the two flow faces 37 and radially between the inner side 33 and the outer side 34. As shown in FIGS. 2A-2B, the media assembly 20 comprises two side panels 40 positioned along the opposite cut sides 31 of the media pack 30. According to one embodiment, the side panel 40 may comprise a gasket, such as a perimeter gasket. According to various embodiments, the side panel 40 may be polyurethane or a high modulus sealant (and thus securing the side panels 40 to each of the cut sides 31 comprises potting each of the cut sides 31 in polyurethane or a high modulus sealant).

The center support 22 is positioned along the inner side 33 of the media pack 30. The center support 22 extends between the two cut sides 31 and axially between the two flow faces 37. Prior to being cut with the media roll 35, the center support 22 may be cylindrical or ring-shaped. The center support 22 may be, for example, a paper, chipboard, or polymer ring and extend directly along the filter media 32 of the media pack 30.

The media assembly 20 (in particular the media pack 30) may be configured or shaped in a variety of different shapes and sizes, according to the desired configuration (such as the available room for the media assembly 20 within a filter assembly). For example, the media pack 30 (and therefore the entire media assembly 20) may have a variety of different circular arc shapes, as shown in FIGS. 2A-3. As shown in FIGS. 2A-2B, the media pack 30 is shaped in approximately ¼ of a circle. As shown in FIG. 3, the media pack 30 is shaped in approximately ½ of a circle.

FIGS. 4A-4C, FIGS. 5A-5B, and FIG. 13 show a manufacturing process 200 of creating or manufacturing the media assembly 20, which allows a wide variety of differently shaped and sized media packs 30 (and thus media assemblies 20) to be easily created. As described further herein, at 210, the filter media 32 is first wound or coiled about the center axis 38 into a master media roll 35 of filter media 32. At 220, the media roll 35 is subsequently cut along a plurality of (at least two) cut lines 14 and into a plurality of (at least two) individual media packs 30 of a plurality of (at least two) media assemblies 20, according to the desired number, shape, and size of media packs 30. This manufacturing process is cost-effective and can create a large number of shapes and sizes of media packs 30, as described herein. The present manufacturing process decreases the total amount of time to create a plurality of media packs 30. Comparatively, stacking layers of filter media into a similar shape to create an individual media pack would present many manufacturing challenges and would not be cost-effective.

Figure 5A:
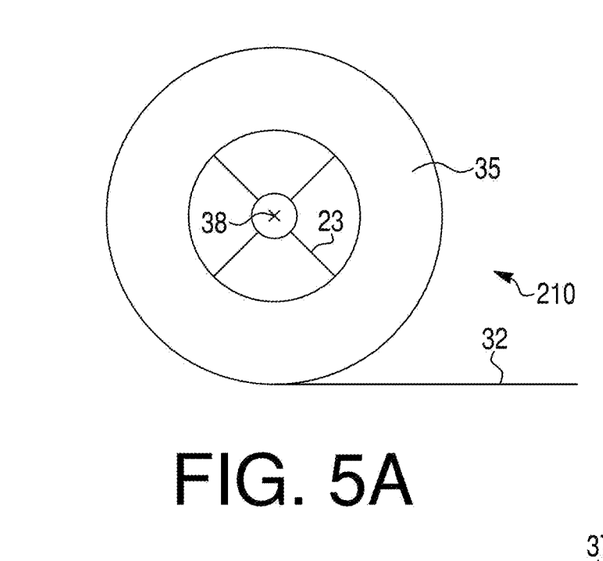
FIG. 5A is an end view of a media roll according to yet another embodiment.
Figure 13:
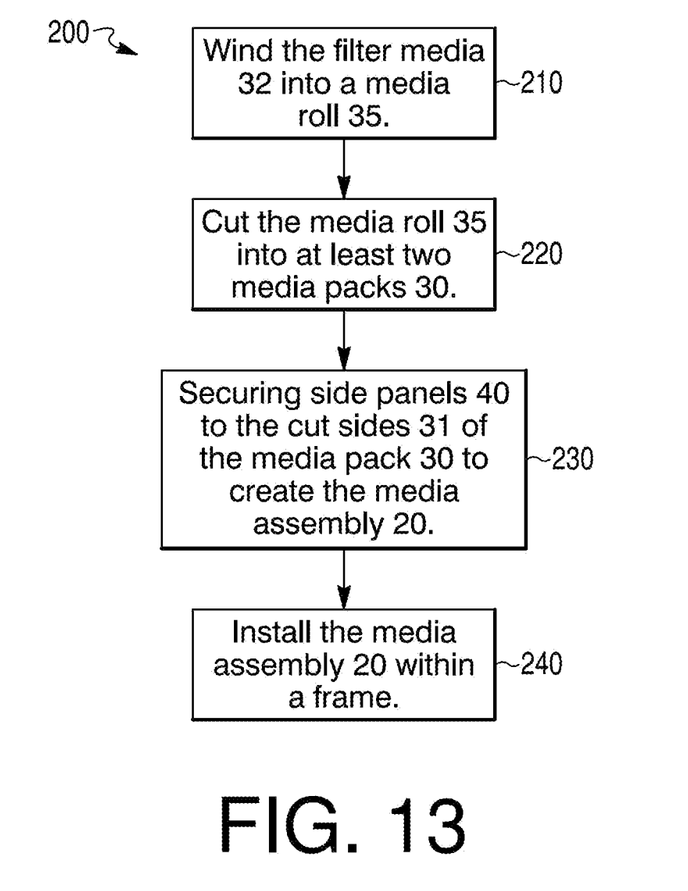
FIG. 13 is a schematic diagram for a method of making a media assembly according to one embodiment.

At 210, the filter media 32 is rolled or wound into a filter media roll 35 (as shown in FIGS. 4A, 5A, and 13). The filter media 32 is wound around a center axis 38 extending along the axial height of the filter media roll 35. One type or a plurality of different types of filter media 32 may be wound into the same media roll 35, depending on the desired configuration.

Optionally, during manufacturing, the filter media 32 may be attached to and wound around the center support 22 (as shown in FIG. 4A) and/or a reusable inner, center winding ring or core 23 (as shown in FIG. 5A). Both the center support 22 and/or the core 23 are positioned within the radial center of the media roll 35 and extend axially along and are centered on the center axis 38. The core 23 is positionable within the center support 22 to provide support to the center support 22. When used, the center support 22 remains attached to the filter media 32 (and may be cut with the media roll 35), while the core 23 is removable from the media pack 30. Accordingly, prior to cutting, the core 23 may be removed from within the media roll 35, and the center support 22 may be cut within the media roll 35.

According to one embodiment, the filter media 32 is attached to and wound around one of the center support 22 or the core 23. A hot melt or adhesive forms a seal between the leading edge of the filter media 32 and the center support 22 or the core 23. According to another embodiment, the filter media 32 is attached to the center support 22, and the center support 22 is slipped or positioned over the core 23 (i.e., the core 23 is positioned within the center support 22). Accordingly, the filter media 32 is wound around both the center support 22 and the core 23. By positioning the center support 22 over the core 23 (and radially between the core 23 and the filter media 32), the center support 22 prevents the hot melt or adhesive from reaching the core 23. According to yet another embodiment, the filter media 32 is not attached to the center support 22 or the core 23 and instead is wound around itself.

Figure 5B:
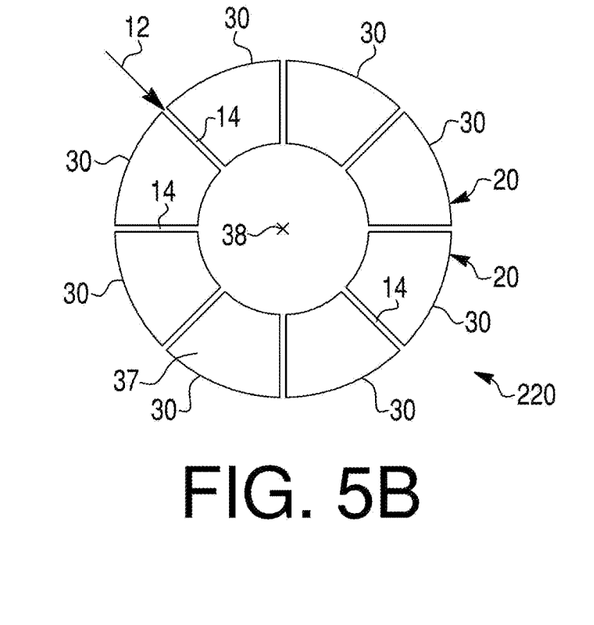
FIG. 5B is an end view of the media roll of FIG. 5A with cut lines.
Figure 11A:
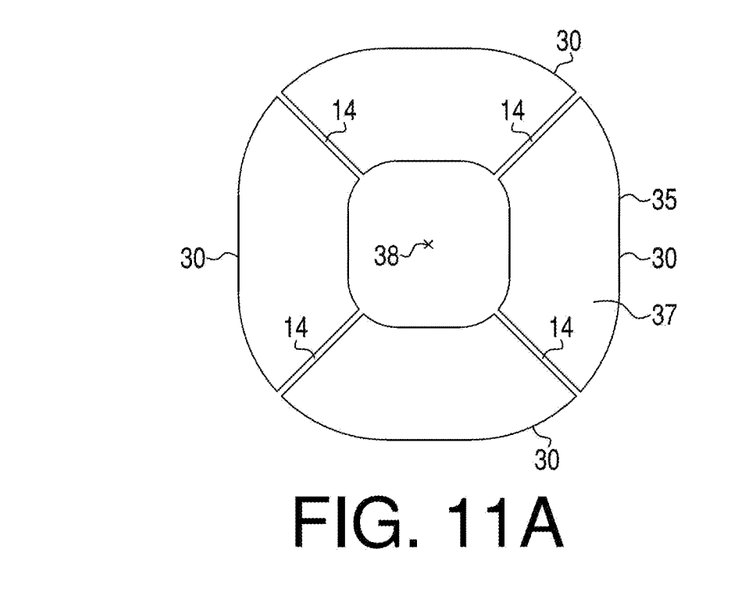
FIG. 11A is an end view of a media roll with cut lines according to one embodiment.
Figure 11B:
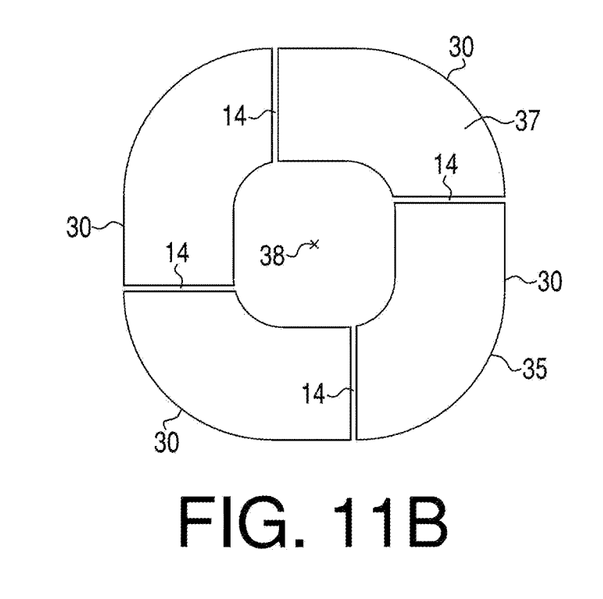
FIG. 11B is an end view of a media roll with cut lines according to another embodiment.
Figure 12A:
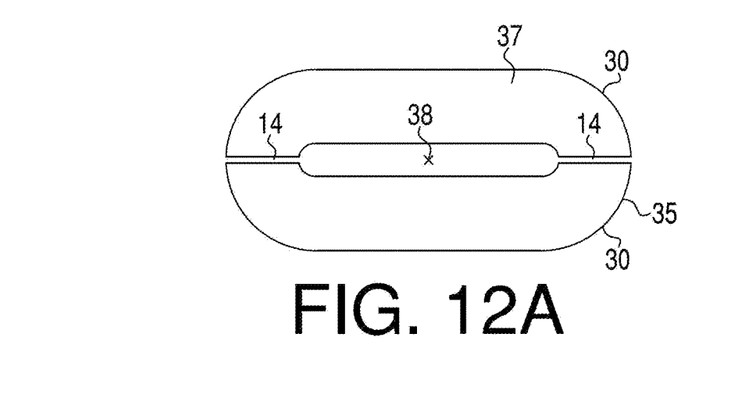
FIG. 12A is an end view of a media roll with cut lines according to yet another embodiment.
Figure 12B:
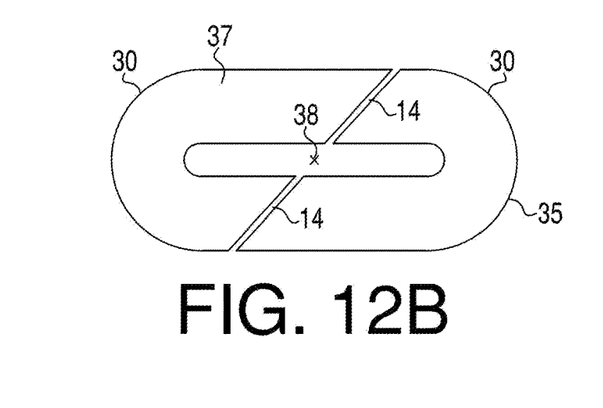
FIG. 12B is an end view of a media roll with cut lines according to still another embodiment.

The center support 22 and/or the core 23 (that the filter media 32 is wound around) may have a variety of different cross-sectional shapes to form the media roll 35 into the desired shape. The media roll 35 has a resulting corresponding cross-sectional shape to the center support 22 and/or the core 23. According to one embodiment, the center support 22 and/or the core 23 (and thus also the media roll 35) have a round (as shown in FIGS. 5A-5B), obround, triangular, square (as shown in FIGS. 11A-11B), oval, rectangular (as shown in FIGS. 12A-12B), pentagonal, or hexagonal cross-sectional shape (where the cross-section is taken along a plane that is perpendicular to the axial length of the center support 22 and the core 23 and to the center axis 38 and corresponds to the flow faces 37). The cross-sectional shape may comprise any number and variation of arcs and flat and/or curved sides or edges.

If the cross-sectional shape of the center support 22 and/or the core 23 is square or rectangular, the corners may be rounded (and the media roll 35 has a corresponding shape, as shown in FIGS. 11A-12B). The resulting shape of the media roll 35 may include both straight and curved sections (as shown in FIGS. 12A-12B), depending on how the filter media 32 is wound and the shape of the center support 22 and/or the core 23. With a square center support 22 or core 23, for example, four equivalent and identically-shaped media packs 30 may be produced without any scrap. Similarly, a pentagonal or hexagonal center support 22 or core 23 may produce five and six equivalent and identically-shaped media packs 30, respectively.

The filter media 32 is wound around the center axis 38 a plurality of times (i.e., any number of times) to create a plurality of layers (i.e., any number of layers) of filter media 32. Accordingly, the total length of the filter media 32 (and the thickness of the filter media 32) determines the outer radius of the media roll 35 (and thus the size of the media pack 30 between inner side 33 and the outer side 34). Accordingly, the size of the media pack 30 (in particular the radial distance between inner side 33 and the outer side 34) may easily be adjusted in the manufacturing process by using filter media 32 with a longer or shorter length. Additionally, the outer diameter of the center support 22 and/or the core 23 sets or determines the inner radius of a center hole of the media roll 35 (though which the center axis 38 extends). Once the filter media 32 is wound into a media roll 35, a hot melt or adhesive may form a seal between the trailing edge of the filter media 32 and the top, outermost layer 32b of the filter media 32.

Optionally, hot melting the filter media 32 may be skipped along the areas where cuts are made. Furthermore, a small scrap section may optionally be incorporated to eliminate start and stop points. The media roll 35 may be wound with dimples.

Figure 4B:
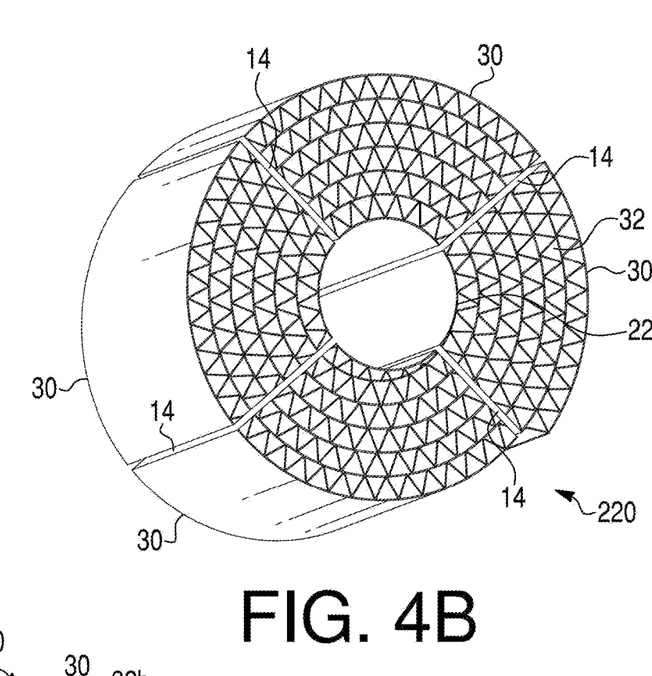
FIG. 4B is a perspective view of the media roll of FIG. 4A with cut lines.
Figure 4C:
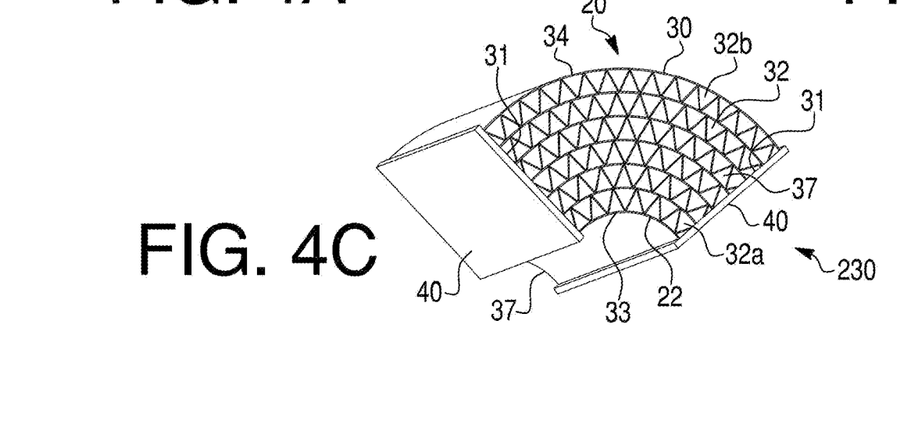
FIG. 4C is a perspective view of a media assembly from the media roll of FIG. 4A.

At 220 (as shown in FIGS. 4B, 5B, and 13), after the filter media 32 has been wound into the media roll 35, the filter media roll 35 is cut with a cutting device with at least two cuts, along at least two cut lines 14, into at least two individual segments or pieces, which form at least two individual media packs 30. The media roll 35 is cut along at least one plane that is parallel to the center axis 38 and to the flow direction through the media pack 30 (and substantially perpendicular to a radial plane of the filter media roll 35). Each of the cut lines 14 extend along planes that are parallel to the center axis 38. As shown in FIG. 5A, the media roll 35 may be cut along arrow 12 (i.e., along each of the cut lines 14). Each of the cuts may extend through only one side or both sides of the media roll 35 (i.e., on opposite sides of the center axis 38, thereby forming two separate cut lines 14 that are radially aligned with each other and form a straight line). Optionally, after the filter media roll 35 has been cut, the filter media roll 35 may be cooled and any debris from cutting may be removed.

A variety of different cutting devices may be used to cut (i.e., to make the cut lines 14 in) the filter media roll 35. For example, according to various embodiments, a sharp edge or a laser may be used to cut the media roll 35. The media roll 35 may optionally be cut by the same person that wound the filter media 32 into the media roll 35. The media roll 35 may optionally be rotated by a certain number of degrees to make each of the cuts.

Any number, angle, and location of cuts may be made in the media roll 35 to form any number, shape, and size of media packs 30, depending on the desired size, shape, and number of media packs 30. Depending on the positioning of the cut lines 14, the resulting cut media packs 30 (from the same media roll 35) may be identical to each other or different from each other in shape and/or size, depending on the desired configuration of media packs 30. At least two cuts along at least two cut lines 14 are made in the media roll 35 to form or create at least two media packs 30 from the single media roll 35. Accordingly, a plurality of media packs 30 may be formed or created from one single media roll 35, which lowers the manufacturing costs compared to conventional manufacturing methods of making media packs. The cut lines 14 may be straight or curved.

Figure 6:
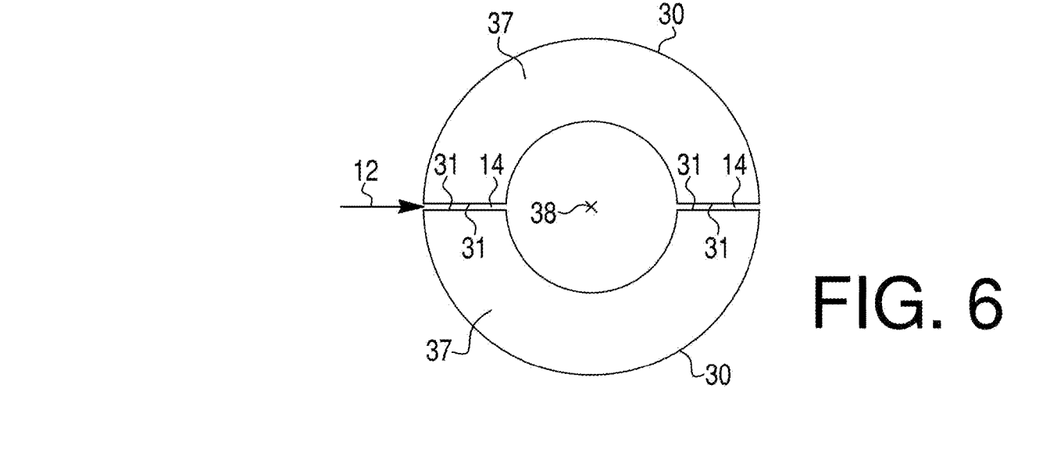
FIG. 6 is an end view of a media roll with cut lines according to another embodiment.

According to various embodiments shown in FIGS. 6 and 12A-12B, a total of two cuts along two cut lines 14 (that are approximately 180° apart from each other) are made, thereby cutting the media roll 35 in half and efficiently creating two media packs 30. Optionally, the two cut lines 14 may align with each other and extend through the center axis 38, thereby creating two identical media packs 30. The two media packs 30 may be semicircular or substantially semicircular (as shown in FIG. 6), and both of the cut sides 31 may be potted or form a seal with in the side panels 40 simultaneously or at the same time (as described further herein). This method produces a unique shape faster and more economically than shapes currently produced. In particular, the single straight-through cut (that produced two aligned cut lines 14 on opposite sides of the center axis 38) can be made quickly and easily, and the single potting sequence replaces two individual molds and potting tasks.

According to various other embodiments, at least three cuts along three cut lines 14 are made, thereby creating at least three media packs 30. According to one embodiment shown in FIGS. 4B and 11A-11B, a total of four cuts along four cut lines 14 (that are approximately 90° apart from each other) are made, thereby creating four media packs 30. The media roll 35 may be cut and rotated in 90° increments to produce four individual media packs 30. According to another embodiment shown in FIG. 5B, a total of eight cuts along eight cut lines 14 (that are approximately 45° apart from each other) are made, thereby creating eight individual media packs 30. The media roll 35 may be cut and rotated at 45° increments to produce the eight media packs 30.

Figure 8A:
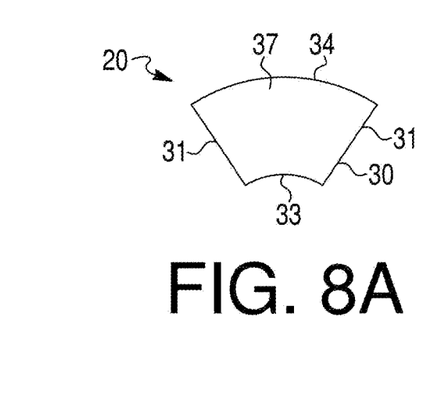
FIG. 8A is an end view of a media assembly according to another embodiment.
Figure 8B:
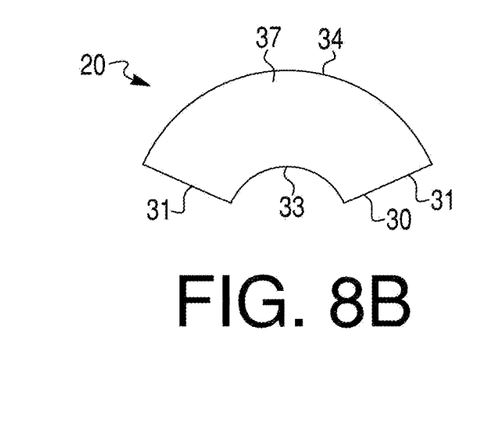
FIG. 8B is an end view of a media assembly according to yet another embodiment.

The cut lines 14 may or may not be aligned with each other on opposite sides of the center axis 38, depending on the desired cutting scheme and configuration of media packs 30. For example, according to various embodiments (as shown in FIGS. 5B-6, 11A, and 12A-12B), one or more of the cut lines 14 may extend through the center axis 38, thereby avoiding having any scraps. Two cut lines 14 may align with each other (in one line), extending straight through the center axis 38 and on opposite sides of the center axis 38. In the resulting media pack 30, the cut sides 31 may be at an angle relative to each other (as shown in FIGS. 8A-8B).

Figure 9:
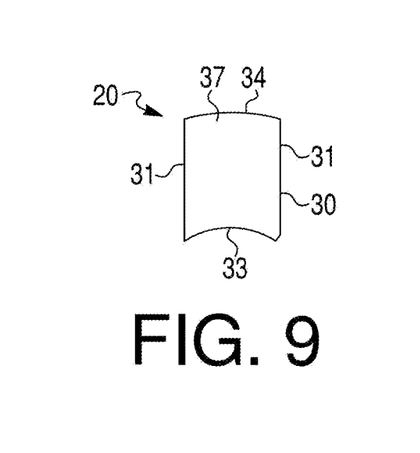
FIG. 9 is an end view of a media assembly according to still another embodiment.

According to various other embodiments, one or more of the cut lines 14 may not extend through the center axis 38, and the cut lines 14 on opposite sides of the center axis 38 may not align with each other (as shown in FIG. 11B). Depending on the orientation of the cut lines 14, in the resulting media pack 30, the cut sides 31 may be substantially parallel to each other (as shown in FIG. 9).

Figure 7:
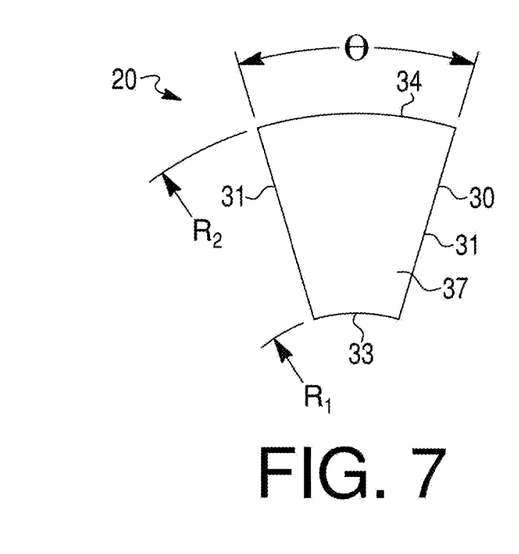
FIG. 7 is an end view of a media assembly according to one embodiment.

Depending on the number of cuts and the relative positioning of the cuts (as well as the size and shape of the media roll 35), different sizes and shapes of the media packs 30 are created. Accordingly, a variety of differently shaped and sized media packs 30 may be easily created or produced from one media roll 35, and the dimensions of the media packs 30 can be easily changed according to the desired configuration and size. For example, as shown in FIG. 7, the arc length along the outer side 34 of the media pack 30 varies depending the angle θ and distance between the cut sides 31. FIG. 8A shows a media pack 30 with a relatively small arc length and angle θ, while FIG. 8B shows a media pack 30 with a relatively large arc length and angle θ. Furthermore, the inner radius $R_1$ and the outer radius $R_2$ vary depending on the shape and size of the media roll 35 and the number and thickness of the filter media 32 (as well as the center support 22 and/or the core 23). The radial distance between the inner side 33 and the outer side 34 depends on the thickness and number of layers of the filter media 32.

The media pack 30 may have a variety of different arc shapes, depending on the original shape of the media roll 35 and how the media roll 35 is cut. According to one embodiment, the media pack 30 is a circular ring segment, compared to the cubic or cylindrical shapes of conventional in-line filter elements. Although the media packs 30 may have a variety of different shapes and sizes, the inner side 33 and the outer side 34 may be at least partially curved or arced, according to various embodiments.

After the media pack 30 has been cut from the media roll 35, the media pack 30 may optionally be expanded to a different radial thickness to change the capacity and restriction of the media pack 30 (without changing the corrugation height of the filter media 32). To expand the media pack 30, the layers of the filter media 32 may be radially spaced further away from each other.

At 230 (as shown in FIGS. 4C and 13), after the media pack 30 has been cut from the media roll 35 and optionally expanded, the side panels 40 are secured to each of the cut sides 31 of the media pack 30. According to one embodiment, the media pack 30 is side-potted with or into the side panel 40, thereby forming the media assembly 20. In particular, side panels 40 are positioned along and attached to each of the two cut sides 31 of the media pack 30 (extending along the two cut lines 14 that form and define the media pack 30), as shown in FIG. 4C. Each of the side panels 40 form a seal with one of the two cut sides 31 of one of the at least two media packs 30. The side panels 40 may each extend along the entire axial and radial length of the media pack 30 (along a plane extending parallel to the center axis 38) and along the entire cut side 31 of the media pack 30.

Figure 10A:
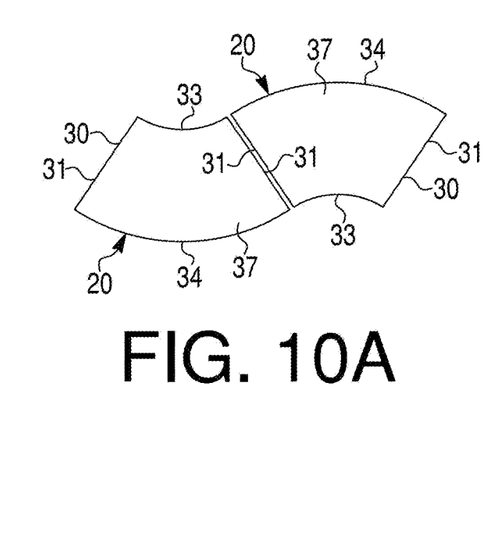
FIG. 10A is an end view of two attached media assemblies according to one embodiment.
Figure 10B:
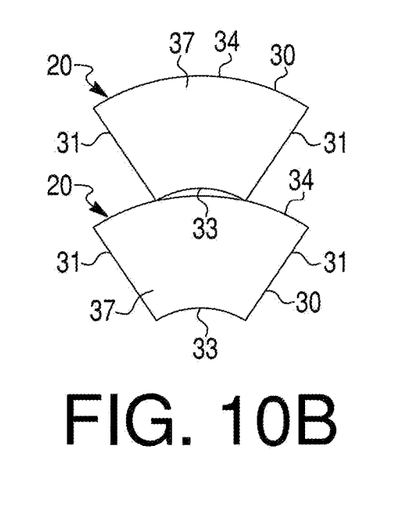
FIG. 10B is an end view of two attached media assemblies according to another embodiment.

Once the media assembly 20 has been created, multiple media assemblies 20 (or individual media packs 30) can easily be combined and attached together without any additional processing. The media assemblies 20 (in particular the media packs 30) can be attached together in a wide variety of different manners and relative orientations to create a wide variety of different overall shapes. These shapes may optionally have complex opposing curvatures that are not otherwise producible by simple winding and/or cutting methods. For example, as shown in FIG. 10A, two media assemblies 20 (in particular two media packs 30) are positioned next to each other (and optionally abutting and attached to each other), with their cut sides 31 facing (and optionally abutting and attached to) each other. The two media packs 30 are facing opposite directions (i.e., the inner side 33 of one media pack 30 is next to the outer side 34 of the other media pack 30 and vice versa), thereby forming a S-shape between the two media packs 30. According to another embodiment as shown in FIG. 10B, two media assemblies 20 (in particular two media packs 30) are positioned next to each other (and optionally abutting and attached to each other), with the inner side 33 of one media pack 30 next to and facing (and optionally abutting and attached to) the outer side 34 of the other media pack 30. Accordingly, the two media packs 30 are stacked on top of each other.

At 240 (as shown in FIG. 13), the media assembly 20 (alone or in combination with other media assemblies 20) is attached to, positioned within, and installed into a frame. The media assembly 20 may include various gaps or individual segments with a gap to be installed onto the frame. According to one embodiment, multiple media assemblies 20 may be potted with or attached to each other within the same frame. A seal may be formed between the multiple media assemblies 20 and the frame. The multiple media assemblies 20 (that are within the single frame) may be identical to each other or different from each other (in shape and size, for example) and may be oriented relative to each other to create a wide variety of different configurations. After the media assemblies 20 have been attached together and/or to the frame, the media assembly 20 (alone or in combination with other media assemblies 20) may be used or positioned within a filter housing of a filter assembly.

Due to the configuration of the media assembly 20, the filter element has inherent warp resistance and provides a natural dust sump as a precleaner. For example, one benefit of the curved shape of the media pack 30 (e.g., the circular ring segment shape) is that the shape of the housing (that the media pack 30 is used within) can thus include corresponding arched or curved sidewalls, which are inherently stronger than flat housing walls and are less susceptible to warpage. Accordingly, the housing can have shallower support ribbing (compared to housing with flat housing walls), which reduces the overall package volume and the housing material costs. Additionally, in off-highway applications, the arched surface (i.e., the inner side 33 or the outer side 34, as described further herein) of the media pack 30 that is facing downward may be used to create a dust collection sump, which naturally channels dust toward a dust evacuation valve.

The media roll 35 described herein is tightly coiled and wound. Furthermore, a seal is formed along both of the cut sides 31 of the resulting media packs 30 from the media roll 35 without the need for any subsequent coiling operations to add form the seal along the second cut side 31 (as described further herein).

Each of the various embodiments disclosed herein may have any of the aspects, features, components, and configurations of the other embodiments, except where noted otherwise.

As utilized herein, the term "approximately" and similar terms are intended to have a broad meaning in harmony with the common and accepted usage by those of ordinary skill in the art to which the subject matter of this disclosure pertains. The term "approximately" as used herein refers to +5% of the referenced measurement, position, or dimension. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

The terms "coupled," "attached," and the like as used herein mean the joining of two members directly to one another. Such joining may be stationary (e.g., permanent) or moveable (e.g., removable or releasable).

References herein to the positions of elements (e.g., "top," "bottom," etc.) are merely used to describe the orientation of various elements in the FIGURES. It should be noted that the orientation of various elements may differ according to other exemplary embodiments, and that such variations are intended to be encompassed by the present disclosure.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, the position of elements may be reversed or otherwise varied, and the nature or number of discrete elements or positions may be altered or varied. The order or sequence of any processes may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A method of manufacturing a media assembly, the method comprising:
   winding a filter media about a center axis into a media roll; and
   cutting the media roll along at least two cut lines and into at least two media packs of at least two media assemblies, the media roll being cut along at least one plane that is parallel to the center axis.

2. The method of claim 1, further comprising securing a side panel to one of two cut ends of one of the at least two media packs.

3. The method of claim 1, further comprising installing the at least two media packs into a frame.

4. The method of claim 1, further comprising potting the at least two media packs so as to form a seal member on at least one cut side of the at least two media packs.

5. The method of claim 1, further comprising attaching the media assembly to a second media assembly so as to form an S-shape.

6. The method of claim 1, wherein the media roll is cut such that the at least two cut lines align with each other and extend through the center axis so as to produce at least two identical media packs.

7. The method of claim 1, where in the media roll is cut using a laser.

8. A media assembly comprising:
   a media pack comprising a plurality of layers of filter media, the media pack defining an inlet flow face, an outlet flow face, a first side wall, a second side wall, a radially inner edge, and a radially outer edge, the first side wall and the second side wall each extending axially between the inlet flow face and the outlet flow face and radially between the radially inner edge and the radially outer edge;
   a first side panel positioned along and forming a seal with the first side wall such that fluid entering through the inlet flow face cannot exit the media pack through the first side wall; and a second side panel positioned along and forming a seal with the second side wall such that fluid entering through the inlet flow face cannot exit the media pack through the second side wall, the media pack being formed by winding the filter media around a center axis into a media roll and cutting the media roll along at least two cut lines to form the first side wall and the second side wall.

9. The media assembly of claim 8, wherein the plurality of layers of filter media curve about the center axis and form an arc shape.

10. The media assembly of claim 8, wherein the plurality of layers of filter media comprise an innermost layer and an outermost layer that is longer than the innermost layer, the innermost layer defining an inner edge of the media pack, and the outermost layer defining an outer edge of the media pack.

11. The media assembly of claim 8, wherein the plurality of layers of filter media comprise an innermost layer and an outermost layer that has substantially the same axial length and curvature as the innermost layer, the innermost layer defining an inner edge of the media pack, and the outermost layer defining an outer edge of the media pack.

12. The media assembly of claim 8, further comprising a center support, the center support extending axially on the media roll and configured to support the media roll.

13. The media assembly of claim 12, where in the media pack is positioned proximate to a second media pack such that the radially inner edge of the media pack is attached to a radially outer edge of the second media pack.

14. The media assembly of claim 12, wherein the plurality of layers of filter media are radially spaced further away from each other after the media pack has been cut so as to increase a radial thickness of the media pack.

15. The media assembly of claim 12, wherein the media roll formed is square with rounded corners such that a plurality of identical media packs are formed when the media roll is cut.

16. A filter element comprising:
a media assembly comprising
a media pack comprising a plurality of layers of filter media, the media pack defining an inlet flow face, an outlet flow face, a first side wall, a second side wall, a radially inner edge, and a radially outer edge, the first side wall and the second side wall each extending axially between the inlet flow face and the outlet flow face and radially between the radially inner edge and the radially outer edge,
a first side panel positioned along and forming a seal with the first side wall such that fluid entering through the inlet flow face cannot exit the media pack through the first side wall, and
a second side panel positioned along and forming a seal with the second side wall such that fluid entering through the inlet flow face cannot exit the media pack through the second side wall,
the media pack being formed by winding the filter media around a center axis into a media roll and cutting the media roll along at least two cut lines to form the first side wall and the second side wall.

17. The filter element of claim 16 wherein the media assembly further comprises a center support positioned along the radially inner edge between the first side wall and the second sidewall, the center support extending axially between the inlet flow face and the outlet flow face.

18. The filter element of claim 16, wherein the plurality of layers of filter media comprise an innermost layer and an outermost layer that is longer than the innermost layer, the innermost layer defining an inner edge of the media pack, and the outermost layer defining an outer edge of the media pack.

19. The filter element of claim 16, wherein:
the first side panel is positioned such that the first side panel extends axially along an entire length of the first side wall; and
the second side panel is positioned such that the second side panel extends axially along an entire length of the second side wall.

20. The filter element of claim 16, wherein the formed media roll comprises a circular ring segment.

* * * * *